United States Patent
Souza Nicory Neto

(10) Patent No.: US 12,017,384 B2
(45) Date of Patent: Jun. 25, 2024

(54) INTEGRATED SYSTEM AND METHOD FOR RECYCLING AND PROCESSING COMPOUND MATERIALS

(71) Applicant: MAGMA INDÚSTRIA COMÉRCIO E IMPORTAÇÃO DE PRODUTOS TÊXTEIS LTDA., São Paulo (BR)

(72) Inventor: Taurino Souza Nicory Neto, São Paulo (BR)

(73) Assignee: MAGMA INDÚSTRIA COMÉRCIO E IMPORTAÇÃO DE PRODUTOS TÊXTEIS LTDA., São Paulo (BR)

( * ) Notice: Subject to any disclaimer, the term of this patent is extended or adjusted under 35 U.S.C. 154(b) by 511 days.

(21) Appl. No.: 17/293,814

(22) PCT Filed: Nov. 8, 2019

(86) PCT No.: PCT/BR2019/050484
§ 371 (c)(1),
(2) Date: May 13, 2021

(87) PCT Pub. No.: WO2020/097704
PCT Pub. Date: May 22, 2020

(65) Prior Publication Data
US 2022/0009130 A1 Jan. 13, 2022

(30) Foreign Application Priority Data
Nov. 13, 2018 (BR) ...................... 10 2018 073350 8

(51) Int. Cl.
*B29B 17/04* (2006.01)
(52) U.S. Cl.
CPC .... *B29B 17/0412* (2013.01); *B29B 2017/044* (2013.01)

(58) Field of Classification Search
CPC .. B29B 17/0412; B29B 17/0036; B29C 48/47
See application file for complete search history.

(56) References Cited

U.S. PATENT DOCUMENTS

| | | | | |
|---|---|---|---|---|
| 5,009,586 A | * | 4/1991 | Pallmann | B30B 15/34 264/913 |
| 6,149,012 A | | 11/2000 | Brooks et al. | |

(Continued)

FOREIGN PATENT DOCUMENTS

| | | |
|---|---|---|
| BR | PI9203607-4 A | 3/1994 |
| CA | 2790574 C | 4/2018 |

(Continued)

OTHER PUBLICATIONS

International Search Report and Written Opinion, International Patent Application No. PCT/BR2019/050484, Dec. 23, 2019, with English translation of Search Report (10 pages).

*Primary Examiner* — Alison L Hindenlang
*Assistant Examiner* — Virak Nguon
(74) *Attorney, Agent, or Firm* — Merchant & Gould P.C.

(57) ABSTRACT

This description relates to the reuse of waste materials based on synthetic resins and, more specifically relates to the reuse of disposable diapers, plastic packaging (PVC, PP, PET, and so on), for the production of raw material for extrusion, lamination, injection and rotational molding processes, among others. A system comprises a chopper, a mill for homogenization of particle size, a disc compactor employing frictional heating between a fixed disc and a rotating disc and cooling by circulation of cold water inside the discs.

3 Claims, 2 Drawing Sheets

(56) References Cited

U.S. PATENT DOCUMENTS

| | | |
|---|---|---|
| 8,940,205 B2 | 1/2015 | Keller |
| 2010/0092794 A1 | 4/2010 | Aylmore |
| 2010/0109007 A1 | 5/2010 | Lee et al. |
| 2011/0210469 A1* | 9/2011 | Keller ................. B29B 17/0412 |
| | | 264/140 |

FOREIGN PATENT DOCUMENTS

| | | | |
|---|---|---|---|
| EP | 92115384 A1 | | 3/1993 |
| KR | 2013138396 A | * | 12/2013 |

* cited by examiner

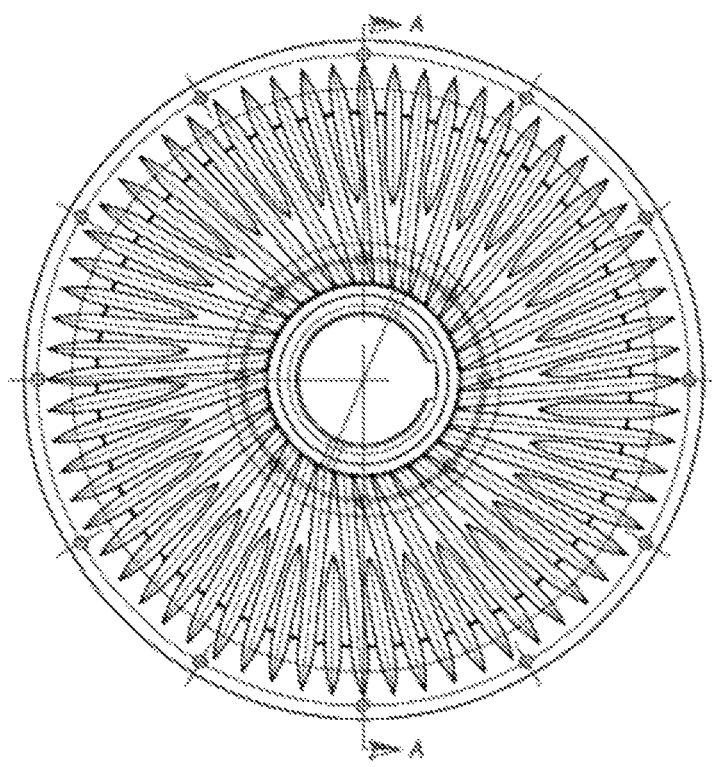 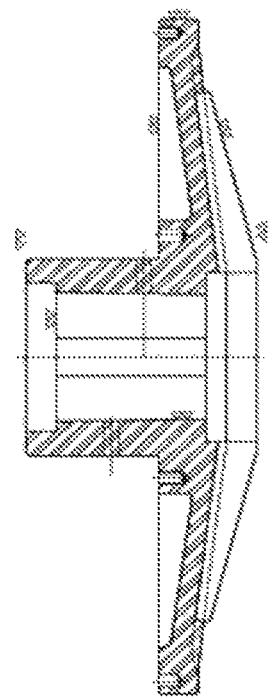
Fig. 4
Fig. 5

INTEGRATED SYSTEM AND METHOD FOR RECYCLING AND PROCESSING COMPOUND MATERIALS

FIELD OF THE INVENTION

The present invention relates to the reuse of waste materials based on synthetic resins and, more specifically, to the processing of plastics of more than one type, such as compound materials, for the production of raw material for extrusion, lamination, injection and rotational molding processes, among others. More particularly, it refers to the reuse of disposable diapers, plastic packaging (PVC, PP, PET, and so on), as well as smaller amounts of non-plastic materials (wood, wood shavings, sawdust, and so on).

BACKGROUND

The reuse of waste and disposable materials can be restrained when such waste consists of materials of various natures, as occurs in the case of diapers, female absorbents, geriatric diapers and the like. For example, a disposable diaper typically includes a soft, porous inner coating, an absorbent layer with cellulosic fibers and superabsorbent polymers, and a moisture-resistant outer coating. The difficulties of processing this type of material, through known techniques, cause such waste to be devoid of commercial value, being, consequently, discarded in landfills or incinerated, which results in a considerable negative impact on the environment.

U.S. Pat. No. 8,940,205 (Keller), titled Production of Useful Articles from Waste Materials, describes a process of using absorbent articles, which are initially cut and then compacted by grinding. During this processing, the material is cooled to be kept at a temperature lower than the melting point. The compacted material is then combined with cellulosic fibers, thermoplastic resins, mineral load, lubricants and other additives and molded into pellets that will be used as raw material in extruders.

Another document representative of the state of the art is the Brazilian patent application PI9203607-4 (Fornasero) entitled "Perfected Apparatus for the Reuse of Heterogeneous Leftover, Particularly Heterogeneous Plastic Material", where the processed material consists of two or more plastic materials. The described system comprises a hot mixing stage in which the material, previously chopped, is introduced into a screw mixer whose central region has sections of helical threads of opposite directions. The mixed homogeneous mass is then subjected to a heat treatment in a second screw mixer whose core has a gradual increase in diameter followed by a sudden discontinuity to provide the degassing of the material.

The method described in this document does not provide good results with plastics that fuse at very different temperatures, for example, temperature range equal to or greater than 50° C. In addition, the use of the screw mixer results in degradation of the material.

OBJECTS OF THE INVENTION

In view of the above, the present invention has as its main object to provide an integrated system and a method of recycling the waste of compound materials, that is, those that comprise more than one type of plastics.

Another object is to provide materials that can replace cellulosic fiber derived materials, such as cardboard.

Another object is to provide a processing method that does not generate waste that can contaminate the environment, surface water or water table.

Another object is to provide a system and method that does not use screw-like devices, which produce the degradation of some materials.

SUMMARY OF THE INVENTION

The above objects, as well as others, are achieved by the invention through a process that allows the recycling of articles made from compound materials wherein said process employs the principle of frictional heating.

According to another feature of the invention, said frictional heating eliminates moisture eventually existing in the articles used as raw material.

According to another feature of the invention, the compaction operation is a dry process, that is, without the use of water or steam in contact with the processed material.

According to another feature of the invention, the proposed system comprises the following equipment: a chopper, a mill for homogenization of particle size, a compactor and a cooler of particles by means of circulation of cold water inside the discs, however without contact with the plastic material.

According to another feature of the invention, the materials chopper comprises a knife mill.

According to another feature of the invention, said compactor comprises a frictional disc compactor, where a first disc is stationary and a second disc rotates at high speed, generating the friction that heats the material.

According to another feature of the invention, the rotation speed of said second disc varies between 400 and 500 RPM, more specifically between 440 and 450 RPM.

According to another feature of the invention, the temperature of the discs in said compactor during the process of compaction of the material is lower than the degradation temperature of the polymers.

BRIEF DESCRIPTION OF THE DRAWINGS

Further advantages and features of the invention will become more evident from the description of an exemplary, non-limiting embodiment and the related figures, in which:

FIG. 4 is a front view of the rotating compacting disc.

FIG. 5 is a sectional view of the rotating compacting disc.

DETAILED DESCRIPTION OF THE INVENTION

There are several barriers to recovering and reusing waste disposable items, mainly plastic packaging used for the packaging of beverages, milk products, softeners, cleaning materials, diapers and disposable absorbents, and so on.

One problem is that such waste usually contains a mixture of materials that are joined together in conventional manufacturing processes. For example, waste may contain mixed plastics of different parts or different types of polymers. Mixed plastics can include fused polypropylene, elastomeric polypropylene and polyethylene, and superabsorbent polymers, among other plastics.

Such materials end up being disposed of in landfills, generating considerable environmental impact since their decomposition can take tens or hundreds of years. The reuse of these materials, in addition to reducing contamination of the environment, has economic advantages since it reduces the need for raw material derived from non-renewable sources.

The proposed system now comprises a materials shredder, a mill for homogenizing the particles size, a friction compactor, and a particle cooler, where the so-called shredder consists of a knife mill.

The compactor consists of a disc compactor, cooled by circulation of water. The cooling water circulation arrangement, which cools the fixed disc and the rotating disc, comprises: in the fixed disc, an internal chamber where thermal exchange takes place; and at the rotator, a rotating joint containing an inlet duct leading to the respective inner chamber where the thermal exchange takes place, and a concentric outlet pipe, external to the inlet one.

Figure 1:
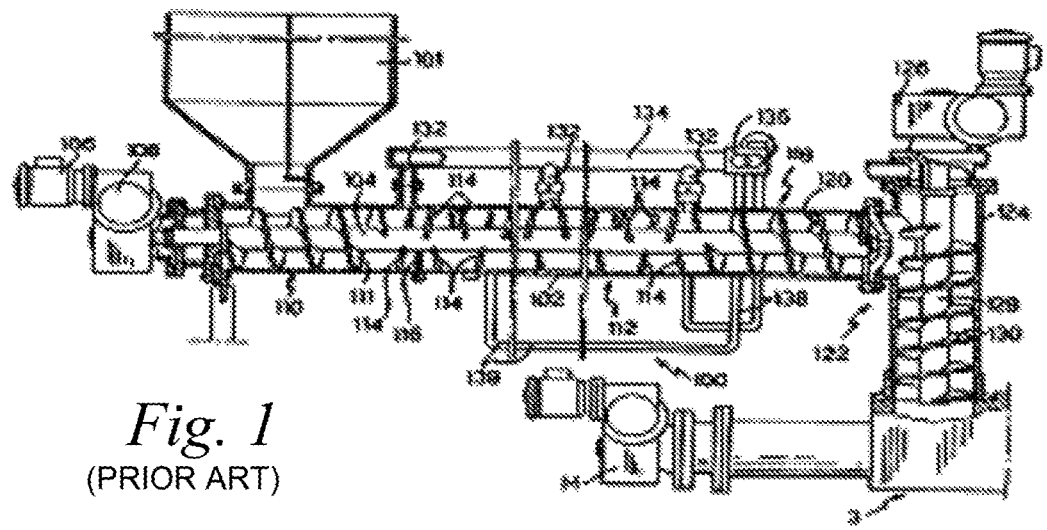
FIGS. 1 and 2 illustrate a known system, specifically the object of patent application PI9203607-4.
Figure 2:
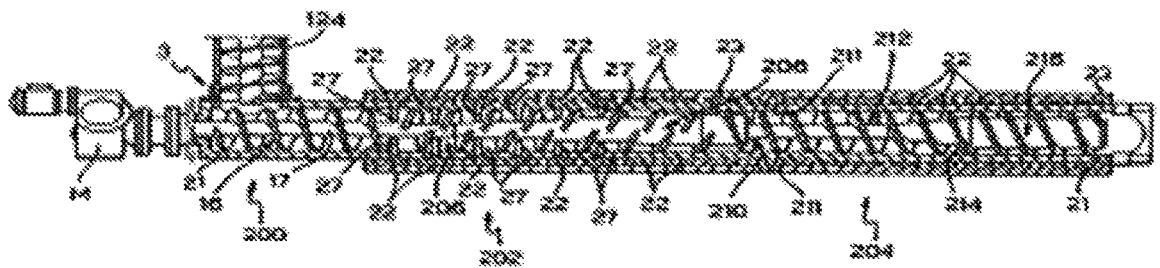
Figure 3:
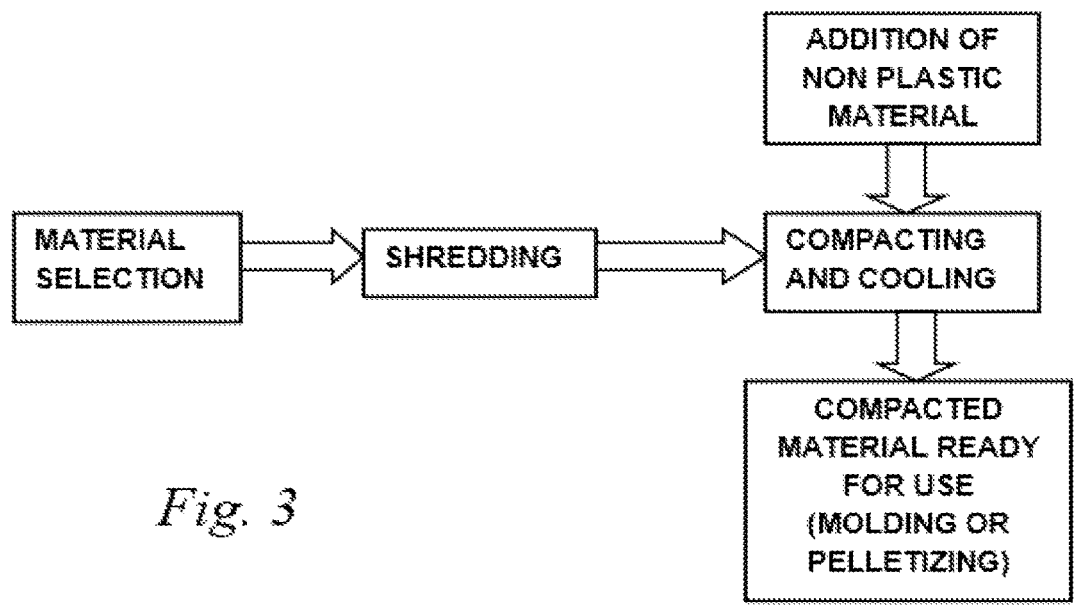
FIG. 3 is a simplified diagram of the proposed method, showing its main steps.

As depicted in the block diagram of FIG. 3, the method of invention comprises steps of material selection, chopping, mixing and dry processing, compaction and cooling.

In the selection stage of materials to be processed, those with high melting temperature such as aramids, polyester, cardboard, rubber, ultra-high molecular weight polyethylene, leather and metals, among others, are eliminated.

After selection, the material goes through a chopping step, in which cutting blades reduce the size of the selected material to bits with approximate fragment size of 6 centimeters or less, suitable for their introduction into the compacting device.

Fragmented thermoplastics are introduced into the frictional disc compactor together with non-plastic materials such as cellulose, superabsorbent polymer (SAP) and textile fibers.

The proportions of these materials used may vary according to the desired formulation. In a typical exemplifying and non-limiting embodiment of the invention, such proportions may be as follows:

PE (polyethylene): 5% to 40%;
TNT (nonwoven material, polypropylene based): 20% to 60%;
PUE (elastane): 0% to 6%;
Cellulose: 20% to 60%;
Absorbent gel: 0% to 8%.

According to the invention, processing uses friction between a first static disc and a second rotating disc, as illustrated in FIGS. 4 and 5. The rotation speed of said second disc is between 400 and 500 RPM, preferably between 440 and 450 RPM. According to the principles of the invention, the compacting operation is a dry process, that is, without adding water or steam in contact with the material submitted to the process. In the stage of compacting the friction of the material between said disc increases the temperature producing the softening of thermoplastics and the homogenization of the processed material without, however, reaching the degradation temperature of these polymers. For most applications, the temperature range should be adjusted according to the nature of the polymers used. Thus, the temperatures of the discs range from 110° C. to 150° C. in the case of the disposable diapers and polyethylene. In the case of polyolefins the maximum temperature is about 130° C.

Once homogenized, the material can then be extruded, or subjected to injection or rotational molding process, or further, be pelletized for storage and subsequent processing by known methods such as extrusion, thermo-molding, and so on.

The invention claimed is:

1. An integrated system for recycling and processing compound materials comprising a material shredder, a particle size homogenizer mill, a friction compactor and particle cooler, wherein said friction compactor and particle cooler comprises a water-cooled disc compactor; wherein the particle size homogenizer mill and the friction compactor and particle cooler are downstream of the material shredder; the material shredder and the particle size homogenizer are located upstream of the friction compactor and particle cooler; and the material shredder comprises a knife mill.

2. A method for recycling and processing compound materials using, as raw materials disposable diapers, plastic packaging, as well as reduced proportions of non-plastic materials, comprising the following sequential steps of material selection, shredding, mixing, compaction and cooling, wherein said compaction is carried out by friction in a disc compactor, in which a first disc is kept fixed and a second disc moves with a rotation speed in the range of 400 to 500 RPM, wherein all of the steps are dry processes, wherein said shredding is carried out by a knife mill that produces shredded material comprising a thermoplastic, and wherein material being delivered to the mixing step comprises the shredded thermoplastic material to which are added non-plastic materials comprising cellulose, superabsorbent polymer and textile fibers.

3. A method according to claim 2, wherein the shredded material produced by the knife mill has a maximum size of 6 cm.

* * * * *